(12) United States Patent
Chiu

(10) Patent No.: US 6,681,686 B1
(45) Date of Patent: Jan. 27, 2004

(54) COCOSHELL FILTERED COLD SMOKE APPARATUS

(76) Inventor: Fu Chiu, 7F, No. 301, Chi Lin Rd., Taipei (TW)

( * ) Notice: Subject to any disclaimer, the term of this patent is extended or adjusted under 35 U.S.C. 154(b) by 0 days.

(21) Appl. No.: 10/351,380

(22) Filed: Jan. 27, 2003

(51) Int. Cl.[7] .............................. A23L 1/00; A23L 1/01; A47J 37/00; A47J 37/04; A47J 37/07
(52) U.S. Cl. ..................... 99/482; 99/467; 126/25 R; 126/59.5
(58) Field of Search .................. 99/339, 340, 444–446, 99/448–450, 400, 401, 481, 482, 516, 534, 467–476; 126/25 R, 21 A, 59.5, 79; 131/329, 330, 185, 200; 110/102, 108, 118, 196; 426/523, 314, 315

(56) References Cited

U.S. PATENT DOCUMENTS

|   |   |   |   |   |
|---|---|---|---|---|
| 620,842 A | * | 3/1899 | Elliott | 43/126 |
| 1,302,682 A | * | 5/1919 | Legg | 99/480 |
| 1,698,749 A | * | 1/1929 | Alsop | 126/59.5 |
| 2,842,043 A | * | 7/1958 | Reuland | 99/482 |
| 4,130,052 A | * | 12/1978 | Jacobson | 99/339 |
| 4,270,464 A | * | 6/1981 | Kerres | 99/482 |
| 4,344,358 A | * | 8/1982 | Maurer | 99/476 |
| 4,823,684 A | * | 4/1989 | Traeger et al. | 99/447 |
| 4,934,260 A | * | 6/1990 | Blevins | 99/482 |
| 4,979,436 A | * | 12/1990 | McGowan | 99/340 |
| 6,012,381 A | * | 1/2000 | Hawn | 99/340 |
| 6,038,965 A | * | 3/2000 | Thorndyke | 99/340 |
| 6,199,474 B1 | * | 3/2001 | Lee | 99/450 |

* cited by examiner

Primary Examiner—Timothy F. Simone
(74) Attorney, Agent, or Firm—Browdy and Neimark, P.L.L.C.

(57) ABSTRACT

In a cocoshell filtered cold smoke apparatus, a heating stove receives a smoke generating material made of coconut shell. A cooling chamber internally provided with multiple filter layers communicates with the heating stove. A liquid cooling unit is respectively connected to a first liquid pipe and a second liquid pipe. An end of the first liquid pipe is connected through first filter cartridges to the liquid cooling unit, and another end of it provided with nozzles is positioned at an upper portion inside the cooling chamber. A gas compressor unit is connected to the cooling chamber to compress the gas and store it in a gas bottle. A meat smoking part includes a smoking chamber inside which are received multiple pieces of meat, placed on a supporting frame, to be smoked. A carriage is further provided to facilitate the displacement of the supporting frame.

8 Claims, 4 Drawing Sheets

COCOSHELL FILTERED COLD SMOKE APPARATUS

BACKGROUND OF THE INVENTION

1. Field of the Invention

The invention relates to a cocoshell filtered cold smoke apparatus. More particularly, the invention provides a cocoshell filtered cold smoke apparatus that can produce the meat smoking gas and use it to smoke pieces of meat.

2. Description of the Related Art

A meat smoking apparatus known in the prior art comprises a burning stove, a cooling chamber, and a plurality of filters. The burning stove is usually provided with a lid, which is removable for placing wood material into the burning stove. The wood, being burned, produces a meat smoking gas (i.e. gaseous carbon) that travels through pieces of ice inside the cooling chamber to be cooled down. After being cooled, the meat smoking gas travels through the filters to obtain a proper meat smoking gas. To smoke meat, pieces of meat are usually gathered inside separate bags, and the meat smoking gas formed as described above is introduced in each bag with the pieces of meat therein.

The above meat smoking apparatus of the prior art has the following downsides.

(1) The use of wood may not be advantageous because it easily burns. The burning time therefore is not sufficiently long. As a result, the amount of produced smoking gas is not sufficient and wood must be regularly introduced in the burning stove, which is not convenient.

(2) Although ice may be effective to cool down the meat smoking gas, ice however rapidly melts. A regular addition of ice is therefore also needed, which is cumbersome to achieve and does not represent an economical solution.

(3) Because the lid of the cooling chamber has to be regularly opened to add the ice, the penetration of contaminants such as dusts, contaminant particles, etc. is therefore undesirably facilitated. As a result, the frequency of replacement of the filters is increased, which increase the maintenance cost.

(4) The filters may be replaced to have an adequate filtration of the meat smoking gas and remove the contaminants. However, the replacement operation of the filters may cause contaminants to enter the meat smoking apparatus.

(5) The conjugated contamination of the meat smoking apparatus due to the addition of the ice inside the cooling chamber and due to the replacement of the filters therefore may limit the amount of adequate smoking gas produced. Mass production is therefore difficult to achieve with the apparatus of the prior art.

(6) The use of bags containing pieces of meat to be smoked is another disadvantage because the meat smoking gas has to be separately introduced in each of the bags.

SUMMARY OF THE INVENTION

It is therefore a principal object of the invention to provide a cocoshell filtered cold smoke apparatus that can produce a meat smoking gas in a greater amount and more rapidly.

It is another object of the invention to provide a cocoshell filtered cold smoke apparatus that can produce a meat smoking gas with an improved quality, which consequently improves the quality of the smoked meat.

Furthermore, it is another object of the invention to provide a cocoshell filtered cold smoke apparatus that can smoke meat more rapidly, more conveniently, and in a greater amount.

To accomplish the above and other objectives, a cocoshell filtered cold smoke apparatus of the invention comprises the following elements. A heating stove is adapted to receive a smoke generating material made of coconut shell material, the heating stove having an electrical heating panel to produce a meat smoking gas via heating the smoke generating material. A cooling chamber is internally provided with a plurality of filter layers and communicating with the heating stove via a first gas pipe. A liquid cooling unit is respectively connected to a first liquid pipe and a second liquid pipe. An end of the first liquid pipe is connected through a plurality of first filter cartridges to the liquid cooling unit, and another end of the first liquid pipe provided with a plurality of nozzles is positioned at an upper portion inside the cooling chamber. The nozzles sputter a cooling liquid over the filter layers inside the cooling chamber, and an end of the second pipe connects to a lower portion inside the cooling chamber. A gas compressor unit is connected to the cooling chamber via a second gas pipe. The second gas pipe is connected through a plurality of second filter cartridges to the gas compressor unit, and the gas compressor unit is further connected to a third gas pipe to deliver the meat smoking gas. A gas bottle further is connected to the third gas pipe to store the produced meat smoking gas. A meat smoking part includes a smoking chamber inside which are received a plurality of pieces of meat, placed on a supporting frame, to be smoked. A carriage is further provided to facilitate the displacement of the supporting frame. To supply the meat smoking gas, a central gas distribution pipe circuit is further provided. The central gas distribution pipe circuit comprises a gas-extracting pipe and a gas-supplying pipe. The gas-extracting pipe is connected to a gas-extracting pump to extract air gas from the interior of the smoking chamber. The gas-supplying pipe is connected to the gas bottle to supply the meat smoking gas to the interior of the smoking chamber.

To provide a further understanding of the invention, the following detailed description illustrates embodiments and examples of the invention that are provided for explaining the invention and should not be construed to limit the scope of the invention.

BRIEF DESCRIPTION OF THE DRAWINGS

The drawings included herein provide a further understanding of the invention. A brief introduction of the drawings is as follows.

DETAILED DESCRIPTION OF THE EMBODIMENTS

Figure 1:
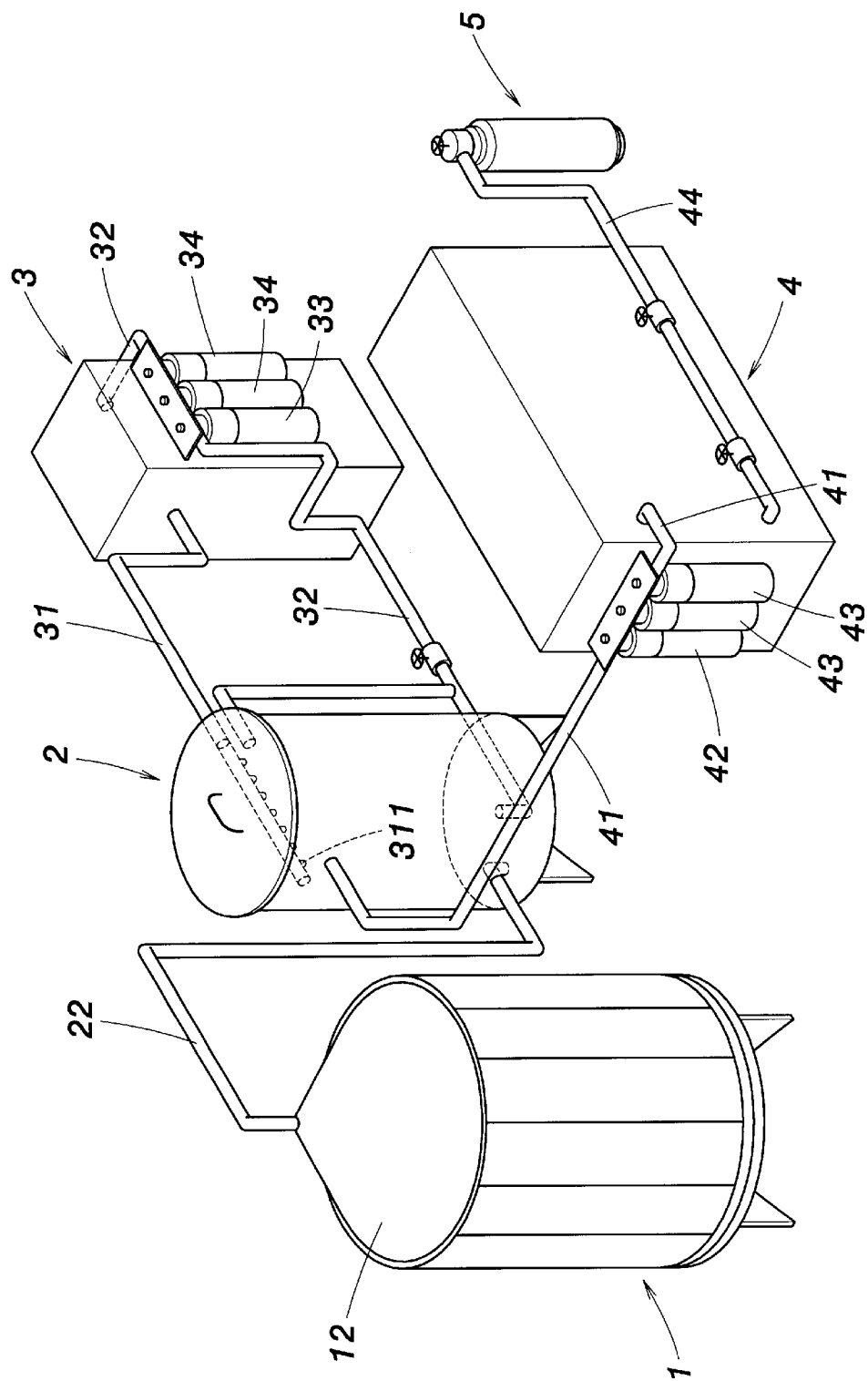
FIG. 1 is a perspective view schematically illustrating the structure part of a cocoshell filtered cold smoke apparatus dedicated to the production of meat smoking gas according to an embodiment of the invention.

Wherever possible in the following description, like reference numerals will refer to like elements and parts unless otherwise illustrated.

Now reference is made to FIG. 1 through FIG. 4 to describe a cocoshell filtered cold smoke apparatus according to an embodiment of the invention. In particular, FIG. 1 and FIG. 2 describe the structure part dedicated to the production of meat smoking gas, and FIG. 3 and FIG. 4 describe the structure part dedicated to the meat smoking operation, by using the produced meat smoking gas.

Figure 2:
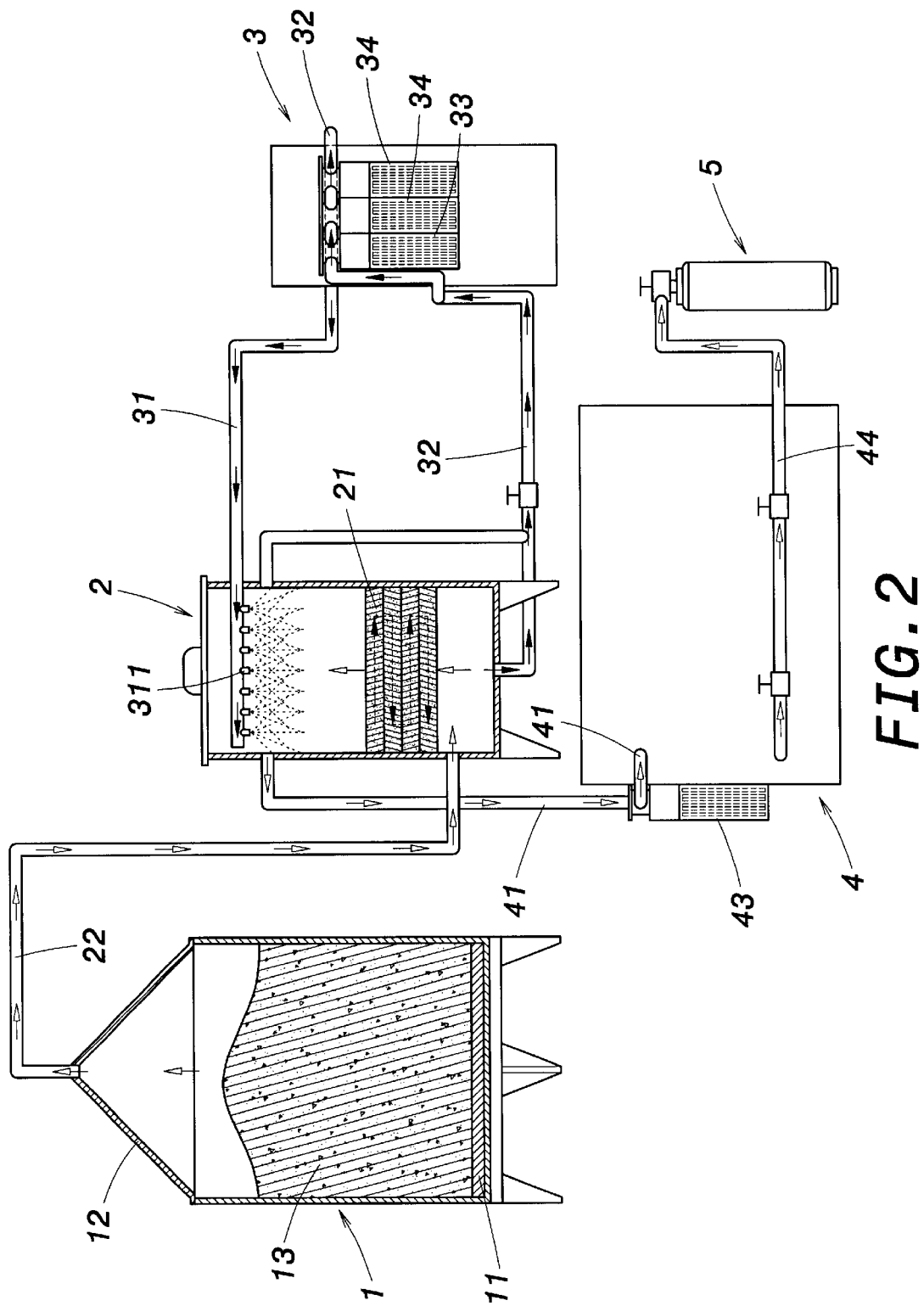
FIG. 2 is a planar view schematically illustrating the structure part of a cocoshell filtered cold smoke apparatus dedicated to the production of meat smoking gas according to an embodiment of the invention.

As illustrated in FIG. 1 and FIG. 2, the structure part dedicated to the production of meat smoking gas comprises a heating stove 1, a cooling chamber 2, a liquid cooling unit 3, and a gas compressor unit 4. A top lid 12 upwardly covers the heating stove 1 while an electrical heating panel 11 is mounted at a bottom thereof. By opening the top lid 12, an adequate amount of smoke generating material 13 can be placed inside the heating stove 1. The smoke generating material 13 is preferably a material that does not easily burn and principally produces carbon oxide gas when being heated inside the stove 1. The material 13 is preferably made of coconut shell material.

The cooling chamber 2 inwardly comprises a plurality of filter layers 21 to retain tars, dusts, and other particles. A first gas pipe 22 connects the cooling chamber 2 and the heating stove 1. Thereby, the carbon oxide smoke produced by heating the material 13 travels through the first gas pipe 22 into the cooling chamber 2 where it is filtered and cooled down.

The liquid cooling unit 3 is used to cool a liquid (typically liquid water). A liquid outlet of the unit 3, through which cooled water is delivered, is connected to an end of a first liquid pipe 31, while a liquid inlet is connected to an end of a second liquid pipe 32. The second liquid pipe 32 is further connected to easily removable general filter cartridge 33 and odor filter cartridges 34. Thereby, used and warm water first passes through the filter cartridges 33, 34 to be adequately filtered before undergoing cooling in the unit 3, and then being delivered inside the cooling chamber 2. Therefore, the cooled water that is delivered inside the cooling chamber 2 has been adequately filtered to particularly remove undesirable odors. The other end of the first liquid pipe 31 is connected to a plurality of sputtering nozzles 311 at an upper location inside the cooling chamber 2. Via the sputtering nozzles 311, the cooled water is finely sprayed over the filter layers 21 to increase the contact area with carbon oxide gas. By progressively circulating through each of the filter layers 21, the circulating direction being indicated by the arrows in FIG. 2, the chilled liquid further contacts with the filter layers 21 through an increased contact and cleaning area. By the above arrangement, carbon oxide gas is effectively filtered and cooled inside the cooling chamber 2.

Furthermore, the other end of the second liquid pipe 32 communicates with a lower interior portion of the cooling chamber 2, below the filter layers 21. Thereby, after having undergone filtering and heat transfer inside the chamber 2, the exhausted liquid is recycled through the second liquid pipe 32 toward the liquid cooling unit 3, by first undergoing filtering and odor removal through the filter cartridges 33, 34. A liquid cycle is thereby achieved between the cooling chamber 2 and the liquid cooling unit 3.

The gas compressor unit 4 is connected to the cooling chamber 2 via a second gas pipe 41 to collect the carbon oxide gas and regulate it to an adequate pressure. The second gas pipe 41 is particularly connected to a general filter cartridge 42 and two odor filter cartridges 43 that are easily replaceable. The gas entering the unit 4 is therefore filtered to particularly remove undesirable odors. The unit 4 further is connected to a third gas pipe 44 to deliver the smoke gas for smoking the meat.

The general filter cartridges 33, 42 respectively internally receive a conventional filter (not shown) with a pore diameter of about 5 microns. The odor filter cartridges 34, 43 respectively contain active carbon (not shown) therein, used to remove undesirable odors. Each of the filter cartridges 33, 34, 42, 43 have valve assemblies (not shown). Therefore, when one filter cartridge is to be replaced, its corresponding valve is sealed to prevent external contamination.

Once the smoke gas has been produced in the manner described above, it is transferred through a third gas pipe 44 into a gas bottle 5 for storage. When it is used for smoking meat, the smoke gas is taken from the gas bottle 5. This use is particularly convenient, and allows a commercialization of the smoke gas.

Figure 3:
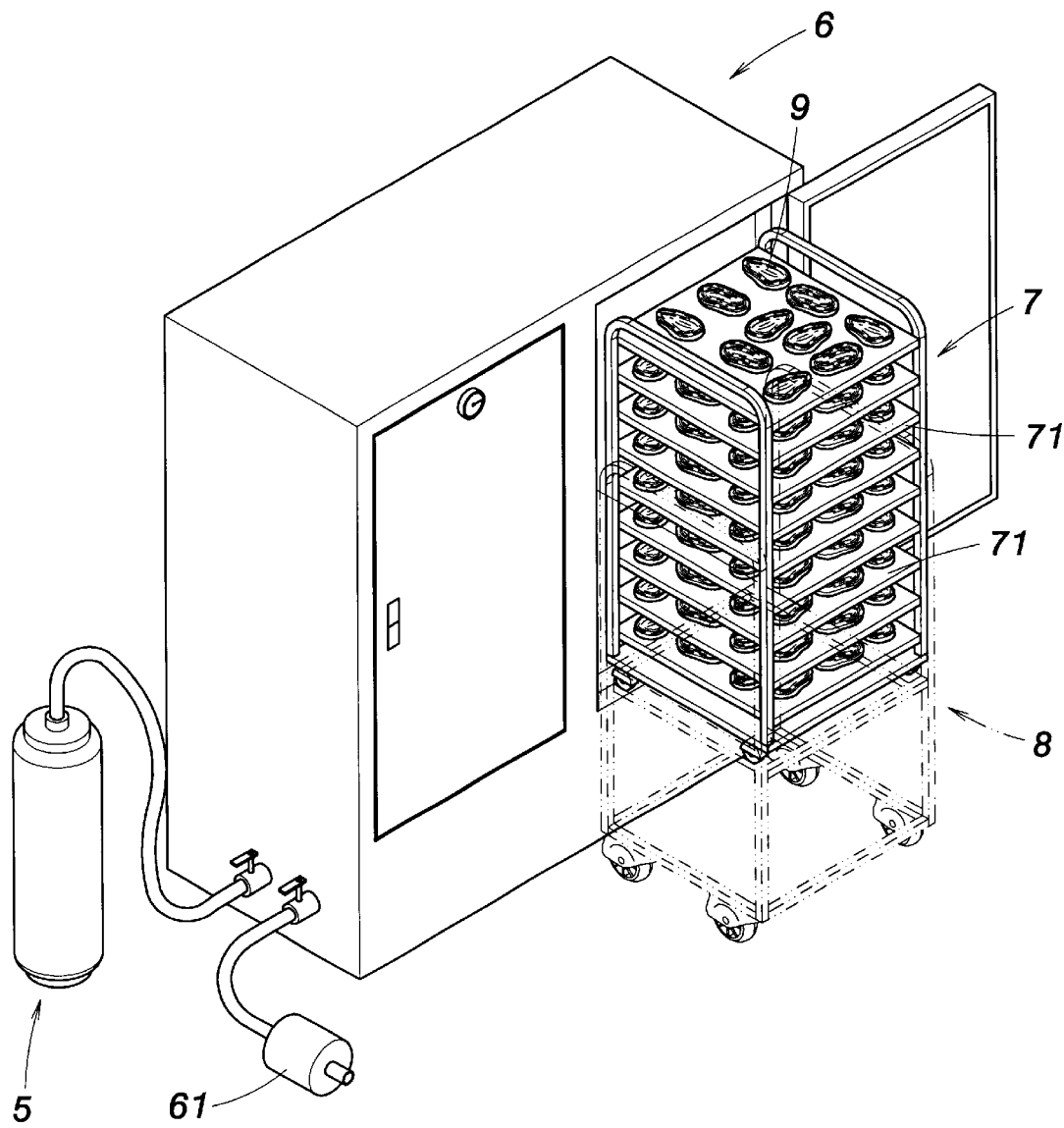
FIG. 3 and FIG. 4 are perspective views schematically illustrating the structure part of a cocoshell filtered cold smoke apparatus dedicated to the meat smoking operation according to an embodiment of the invention.
Figure 4:
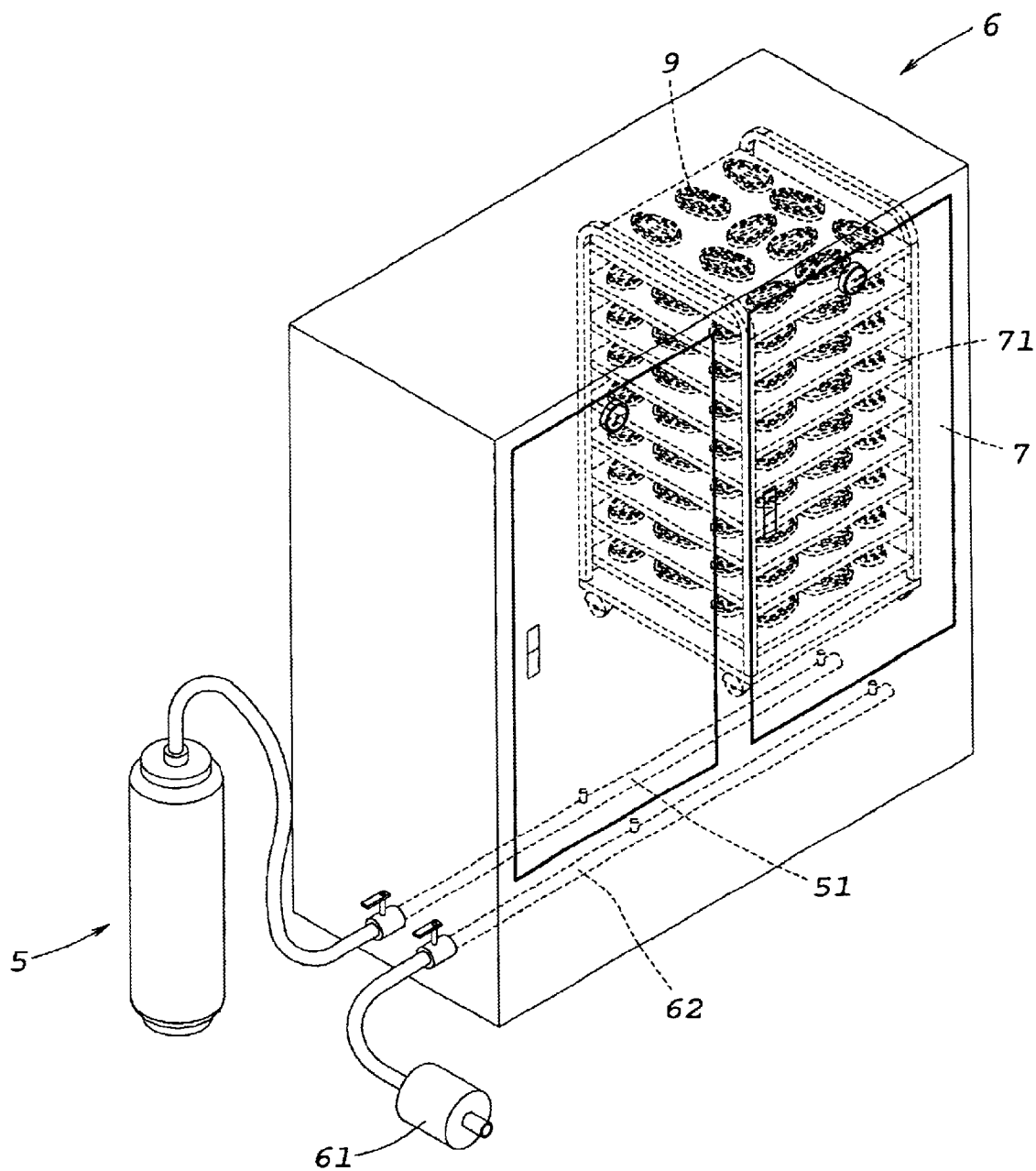

Reference now is made to FIG. 3 and FIG. 4 to describe the structure part of the cocoshell filtered cold smoke apparatus dedicated to the smoking of the meat according to an embodiment of the invention. This structure part comprises a smoking chamber 6, a supporting frame 7, and a carriage 8. The smoking chamber 6 is provided with doors that can be opened and closed to perform smoking, and may include one or more separate compartments where are received the meat to be smoked. The meat smoking gas is delivered inside the smoking chamber 6 either directly from the gas bottle 5 or via a central gas distribution pipe circuit (as described hereafter).

The supporting frame 7 includes a plurality of shelves 71 where are placed the pieces of meat 9 to be smoked. After placement of the pieces of meat 9 on the shelves 71, the supporting frame 7 is entirely placed inside the smoking chamber 6 to perform smoking. This processing is therefore convenient, fast, and can be adapted to a mass production, which represents an improvement in comparison with the conventional method wherein the meat smoking gas is successively supplied to each bag containing the pieces of meat.

The supporting frame 7 may be either provided with rotating wheels that allows its easy move, or placed on a carriage 8 provided with rotating wheels, as illustrated in the drawings. After having been smoked inside the smoking chamber 6, the pieces of meat 9 may be vacuum packaged, frozen, and packed.

The aforementioned central gas distribution pipe circuit (not entirely shown) comprises a plurality of gas-extracting pipes (not shown) and a plurality of gas-supplying pipes 51, which are respectively connected to the compartments of the smoking chamber 6. Via a gas-extractor pump 61, the air inside each of the compartments of the smoking chamber 6 is extracted through a gas extraction pipe 62 to form a vacuum therein. The gas-supplying pipes 51 provide the meat smoking gas, which is stored in the gas bottle 5, to the compartments of the smoking chamber 6 to smoke the meat placed therein. The meat smoking operation is therefore convenient and efficient, which allows a mass production.

As described above, the invention, by using a smoke generating material 13 that is resistant to burning, typically coconut shell material, the produced amount of meat smoking gas is therefore increased. Due to a longer time for burning the coconut shell material, the addition of smoke generating material such as conventionally performed in the prior art therefore is not needed in the invention. Furthermore, by using a cyclic liquid cooling unit 3, the invention no longer needs the addition of cooling ice in the cooling chamber 2 from the exterior, which eliminates the need of regular opening of the cooling chamber 2 and thereby prevents contaminant penetration. By the adequate mount of filter cartridges, the cooling liquid therefore is regularly kept clean to effectively remove contaminant from the meat smoking gas. Being preferably easily removable and provided with valves, the replacement of the filter cartridges can be performed without contamination of the produced meat smoking gas.

According to another advantage of the invention, the cooling liquid is sputtered over the meat smoking gas to improve the contact area with the gas, while a plurality of filter layers 21 receive and filter the sputtered cooling liquid. Cooling of the gas is therefore effectively performed while the filtration of the cooling liquid is further improved.

As a result of the above dispositions, the quality and conservation of the produced smoked meat is improved.

Furthermore, by using a smoking chamber 6 in which a batch of numerous pieces of meat is smoked at a time, the invention is therefore more efficient if compared to the prior art, where bags with a reduced number of pieces of meat are separately filled with the smoking gas. With a smoking chamber having several compartments, respectively supplied with the smoking gas via a central gas distribution pipe circuit, the amount of smoked pieces of meat produced may be further increased within a same processing time. Mass production therefore can be efficiently performed.

Those skilled in the art will readily appreciate that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A cocoshell filtered cold smoke apparatus, comprising:

a heating stove, adapted to receive a smoke generating material made of coconut shell material, the heating stove having an electrical heating panel to produce a meat smoking gas via heating the smoke generating material;

a cooling chamber, internally provided with a plurality of filter layers and communicating with the heating stove via a first gas pipe;

a liquid cooling unit, respectively connected to a first liquid pipe and a second liquid pipe, wherein an end of the first liquid pipe is connected through a plurality of first filter cartridges to the liquid cooling unit and another end of the first liquid pipe provided with a plurality of nozzles is positioned at an upper portion inside the cooling chamber, the nozzles sputtering a cooling liquid over the filter layers inside the cooling chamber, and an end of the second pipe connecting to a lower portion inside the cooling chamber;

a gas compressor unit, connected to the cooling chamber via a second gas pipe, wherein the second gas pipe is connected through a plurality of second filter cartridges to the gas compressor unit, and the gas compressor unit is further connected to a third gas pipe to deliver the meat smoking gas;

a gas bottle, connected to the third gas pipe to store the produced meat smoking gas; and a meat smoking part, including a smoking chamber, a supporting frame, a carriage, and a central gas distribution pipe circuit, wherein the smoking chamber receives the introduction of the meat smoking gas;

the supporting frame has a plurality of shelves on which are placed a plurality of pieces of meat, the supporting frame being received inside the smoking chamber to smoke the pieces of meat;

the carriage carries the supporting frame to facilitate the displacement of the supporting frame from and to the smoking chamber; and the central gas distribution pipe circuit comprises a gas-extracting pipe and a gas-supplying pipe, the gas-extracting pipe being connected to a gas-extracting pump to extract air gas from the interior of the smoking chamber, and the gas-supplying pipe being connected to the gas bottle to supply the meat smoking gas to an interior of the smoking chamber.

2. The apparatus of claim 1, wherein the nozzles deliver the cooling liquid with a fine spray manner.

3. The apparatus of claim 1, wherein the first and second filter cartridges include odor filter cartridges that contain active carbon.

4. The apparatus of claim 1, wherein the first and second filter cartridges include general filters.

5. The apparatus of claim 1, wherein the first and second filter cartridges respectively include valve devices.

6. The apparatus of claim 1, wherein the smoking chamber includes a monolithic compartment.

7. The apparatus of claim 1, wherein the smoking chamber includes two compartments inside each of which respectively pass one gas-extracting pipe and one gas-supplying pipe.

8. The apparatus of claim 1, wherein the smoking chamber includes three or more compartments inside each of which respectively pass one gas-extracting pipe and one gas-supplying pipe.

* * * * *